(12) United States Patent
Hunt

(10) Patent No.: US 6,192,398 B1
(45) Date of Patent: Feb. 20, 2001

(54) REMOTE/SHARED BROWSER CACHE

(75) Inventor: Gary T. Hunt, Austin, TX (US)

(73) Assignee: International Business Machines Corporation, Armonk, NY (US)

( * ) Notice: Under 35 U.S.C. 154(b), the term of this patent shall be extended for 0 days.

(21) Appl. No.: 08/953,348

(22) Filed: Oct. 17, 1997

(51) Int. Cl.⁷ .......................... C06F 15/173; C06F 17/30
(52) U.S. Cl. .............................. 709/213; 707/10; 709/218
(58) Field of Search ...................... 395/200.43, 200.33, 395/200.57, 200.47, 200.56; 709/213, 217, 218, 219, 248, 249; 707/10

(56) References Cited

U.S. PATENT DOCUMENTS

| | | | |
|---|---|---|---|
| 4,445,174 | 4/1984 | Fletcher | 364/200 |
| 5,297,265 | 3/1994 | Frank et al. | 395/400 |
| 5,604,882 | 2/1997 | Hoover et al. | 395/448 |
| 5,727,159 * | 3/1998 | Kikinis | 395/200.76 |
| 5,784,590 * | 7/1998 | Cohen et al. | 711/122 |
| 5,787,466 * | 7/1998 | Berliner | 711/117 |
| 5,796,973 * | 8/1998 | Witt et al. | 395/384 |
| 5,796,974 * | 8/1998 | Goddard et al. | 395/387 |
| 5,878,218 * | 3/1999 | Maddalozzo, Jr. et al. | 709/213 |
| 5,944,780 * | 8/1999 | Chase et al. | 709/201 |

OTHER PUBLICATIONS

C.R. Saravanan, "WWW in DSM" Master's thesis. Univ. of Manitoba, 1997. Univ. of Manitoba Tech. Report TR97–05.*

* cited by examiner

Primary Examiner—Dung C. Dinh
(74) Attorney, Agent, or Firm—Jeffrey S. Labaw; Felsman, Bradley, Vaden, Gunter & Dillon, LLP

(57) ABSTRACT

Browsers for different clients in an enterprise are configured to cache pages at least in part in a common file area in a remote, shared file server. Duplication or redundancy in caching pages is thus eliminate, and a larger body of distinct pages may be cached within a given allocation of memory space. Each remote, shared cache includes a shared cache contents data structure including information required to "time-out" pages and to determine if a page is in the process of being loaded or updated by another client sharing the cache. Where multiple caches are supported by the browsers, the remote, shared cache may form part of a local/remote cache hierarchy. When accessing a page, browsers check each cache in a multiple cache configuration, updating all caches as necessary.

30 Claims, 5 Drawing Sheets

REMOTE/SHARED BROWSER CACHE

RELATED APPLICATIONS

The present invention is related to the subject matter of commonly assigned, copending U.S. Patent application Ser. No. 08/953,347 (pending) entitled "SHARED WEB PAGE CACHING AT BROWSERS FOR AN INTRANET." The content of the above-mentioned copending application is incorporated herein by reference.

BACKGROUND OF THE INVENTION

1. Technical Field

The present invention relates in general to accessing Web pages and in particular to accessing Web pages in environments including a server shared by multiple users. Still more particularly, the present invention relates to remote caching of Web pages on a file server utilized by multiple users.

2. Description of the Related Art

The Internet provides a valuable source of both entertainment and information to all segments of society. In addition to commercial enterprises utilizing the Internet as an integral part of their marketing efforts in promoting their products or services, many federal, state, and local government agencies are also employing Internet sites for informational purposes, particularly agencies which must interact with virtually all segments of society such as the Internal Revenue Service and secretaries of state. Operating costs for both commercial enterprises and governmental agencies may be reduced by providing informational guides and/or searchable databases online.

Currently, the most commonly employed method of accessing and distributing data over the Internet is to employ the World Wide Web (WWW) environment, also called simply "the Web." Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling transfer of various data files (e.g., text, still graphic images, audio, motion video, etc.). Information is formatted for transfer and presentation to a user by a standard page description language, the Hypertext Markup Language (HTML).

In addition to basic formatting, HTML allows developers to specify "links" to other Web resources, identified by a Uniform Resource Locator (URL). A URL is a special syntax identifier defining a communications path to an Internet server containing specific logical blocks of information, colloquially called a "page," accessible to an Internet client. Web pages may be of arbitrary size and include text, graphics, forms for submitting queries to databases on the remote server, and other components. A "page" includes all files required to present the information requested utilizing the identifying URL, including text/HTML files, graphics files, sound files, etc.

Retrieval of information on the Web is generally accomplished with an HTML-compatible "browser"—an application program capable of submitting a request for information identified by a URL—at the client machine. The request is submitted to a server connected to the client and may be handled by a series of servers to effect retrieval of the requested information. The information is provided to the client formatted according to HTML.

When Web pages are retrieved under direct user control, it is common practice for contemporary Web browsers to cache pages accessed by the user. Network bandwidth is finite, and the time required to retrieve a Web page depends in part on the number of servers at the site from which the Web page is being retrieved. Furthermore, Web pages often include sizable graphics files or other large files requiring a substantial amount of time to transfer from the source to the requesting client. Caching Web pages allows a user to repeatedly view the information within a short span of time without retrieving the Web pages each time.

Large traffic demands to specific Web sites can make access to such sites difficult. To ease the difficulty of accessing sites with high traffic demands, Web browsers retrieve frequently accessed Web pages by off-line browsing. Off-line browsing allows information at the site to be retrieved during off-peak periods without contemporaneous user interaction at the client. The pages are typically retrieved from the originating Internet Web site by off-peak retrieval, or retrieval during periods when traffic to the site is at a minimum. The retrieved pages are cached in a local memory, such as a hard drive, for subsequent off-line viewing by the user without connection to the Web site from which those pages originate.

Where several users in an enterprise access and cache the same Web page or pages, it is inefficient for each user to caches these pages locally. Caching is also currently performed at proxies, but caching at proxies is not scalable as such and may not provide benefits for multiple users which browse the same or similar pages due to a lack of ability to share the cache. It would be desirable, therefore, to improve the storage of frequently accessed Web pages to improve the performance of an Intranet, the Internet, and Internet service providers.

SUMMARY OF THE INVENTION

It is therefore one object of the present invention to provide an improved method of and apparatus for accessing Web pages.

It is another object of the present invention to provide an improved method of and apparatus for accessing Web pages in environments including a server shared by multiple users.

It is yet another object of the present invention to provide a method and apparatus for remote caching of Web pages on a file server utilized by multiple users.

The foregoing objects are achieved as is now described. Browsers for different clients in an enterprise are configured to cache pages at least in part in a common file area in a remote, shared file server. Duplication or redundancy in caching pages is thus reduced or eliminated, and a larger body of distinct pages may be cached within the aggregate allocation of memory space for the individual clients. Each remote, shared cache includes a shared cache contents data structure including information required to "time-out" pages and to determine if a page is in the process of being loaded or updated by another client sharing the cache. Where multiple caches are supported by the browsers, the remote, shared cache may form part of a local/remote cache hierarchy. When accessing a page, browsers check each cache in a multiple cache configuration, updating all caches as necessary.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
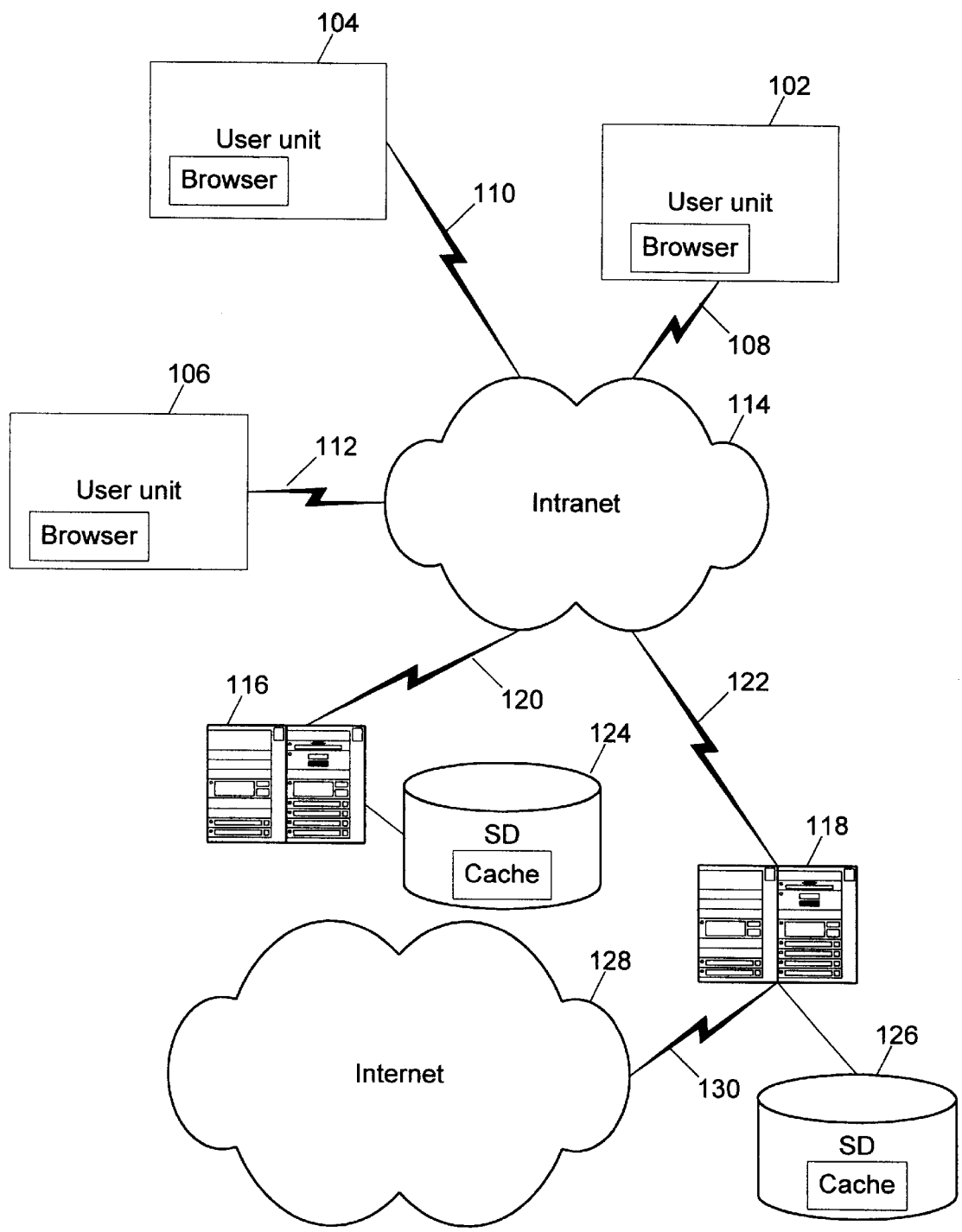
FIG. 1 depicts a network of data processing systems in which a preferred embodiment of the present invention may be implemented.

With reference now to the figures, and in particular with reference to FIG. 1, a network of data processing systems in which a preferred embodiment of the present invention may be implemented is depicted. The network depicted in the exemplary embodiment includes a plurality of user units 102–106 connected via respective communications links 108–112 as part of an intranet 114. An "intranet" is a high bandwidth network of workstations connected to (and protected from) external data processing systems or networks by a firewall and/or proxy. Servers 116–118 are also connected to intranet 114, via communications links 120–122. Intranet 114 supports communications and data transfers among various data processing systems, including user units 102–106 and servers 116–118, by a network technology such as Ethernet, token ring, fiber distributed data interface (FDDI), or asynchronous transfer mode (ATM). Data transmission within intranet 114 may be governed by various protocols, such as frame relay (FR), X.25, integrated services digital network (ISDN), media access control address protocol, or transmission convergence protocol/Internet protocol (TCP/IP).

Servers 116–118 include storage devices 124–126, respectively, providing remote storage for user units 102–106. At least one server, server 118 in the depicted example, is connected via communications link 130 to the Internet 128. Communications link 130 may, for example, be provided in the form of access service by an Internet Service Provider (ISP), or may be a direct connection to the Internet via a firewall and a proxy. Server 118 in the exemplary embodiment functions as an Internet or Web server, and thus server 118 includes a firewall and a proxy in accordance with the known art to provide client systems such as user units 102–106 access to the Internet. Server 118 supports browser applications running on Internet client systems such as user units 102–106 in retrieval of Web pages formatted in HTML. Such Web pages may be passed via a series of servers within both Internet 128 and intranet 114 to a particular client system within user units 102–106. Thus, intranet 114 may include additional servers (not shown) through which data transfers from server 118 to user units 102–106 pass, or such data transfers may also pass through server 116. Additionally, although server 118 in the depicted embodiment provides access to the Internet, a common cache in accordance with a preferred embodiment of the present invention may be maintained within the shared file area of a different server, such as server 116, to which each user unit 102–106 is connected.

In accordance with a preferred embodiment of the present invention, each user unit 102–106 which includes a browser should, because of formatting differences among browser caches, utilize the same browser, or at least browsers employing a common or standardized cache structure and/or format.

Figure 2:
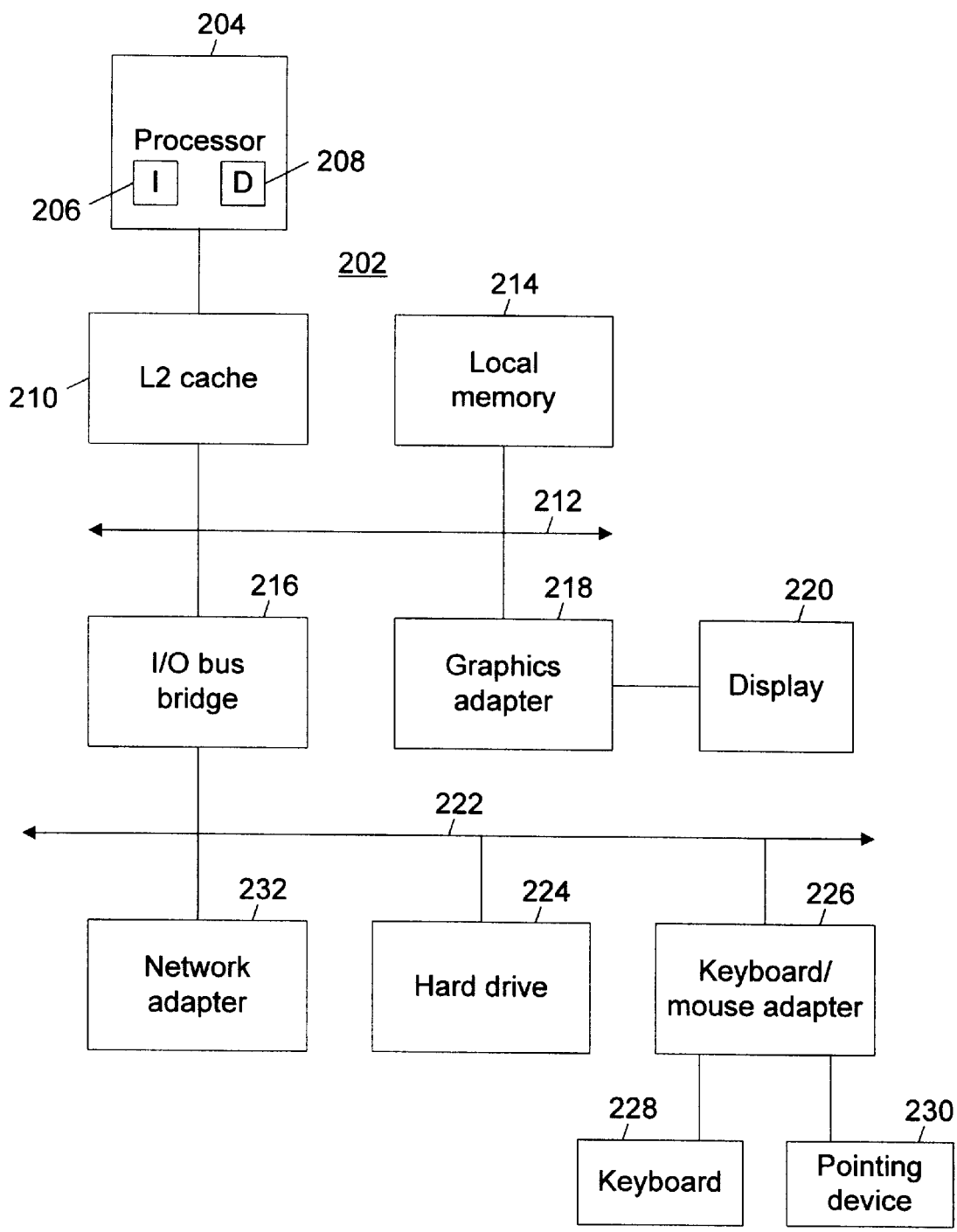
FIG. 2 is a data processing system in which a preferred embodiment of the present invention may be implemented.

Referring to FIG. 2, a data processing system in which a preferred embodiment of the present invention may be implemented is illustrated. Data processing system 202 may be employed as one of user units 102–106 within the network depicted in FIG. 1, or as one of servers 116–118. Modifications to the embodiment depicted may be appropriate depending on how data processing system 202 is utilized.

Data processing system 202 includes a processor 204 having internal level one instruction and data caches 206 and 208. Processor 202 is connected to a level two (L2) cache 210, which is connected via system bus 212 to system memory 214 and to bridge 216. Memory mapped devices, such as graphics adapter 218 connected to display unit 222, may also be connected to system bus 212.

Bridge 216 connects system bus 212 to input/output (I/O) bus 222. Various peripherals may be connected to I/O bus 222, such as hard disk drive 224. Keyboard/mouse adapter 226 connected to I/O bus 222 allows a keyboard 228 and pointing device 230 such as a mouse or trackball to be connected to data processing system 202. Network adapter 232 connected to I/O bus 222 allows data processing system 202 to be connected to a local area network (LAN) such as intranet 114 depicted in FIG. 1, or to the Internet 128.

The operation of data processing system 202 is well known to those skilled in the art. Furthermore, those in the art will recognize that the components depicted in the exemplary embodiment may be varied for purposes of specific applications. For example, additional peripheral devices such as a CD-ROM drive may be incorporated into data processing system 202. In accordance with a preferred embodiment of the present invention, data processing system 202 includes a browser application with the functionality described below supporting remote caching on a shared server.

Figures 3, 4:
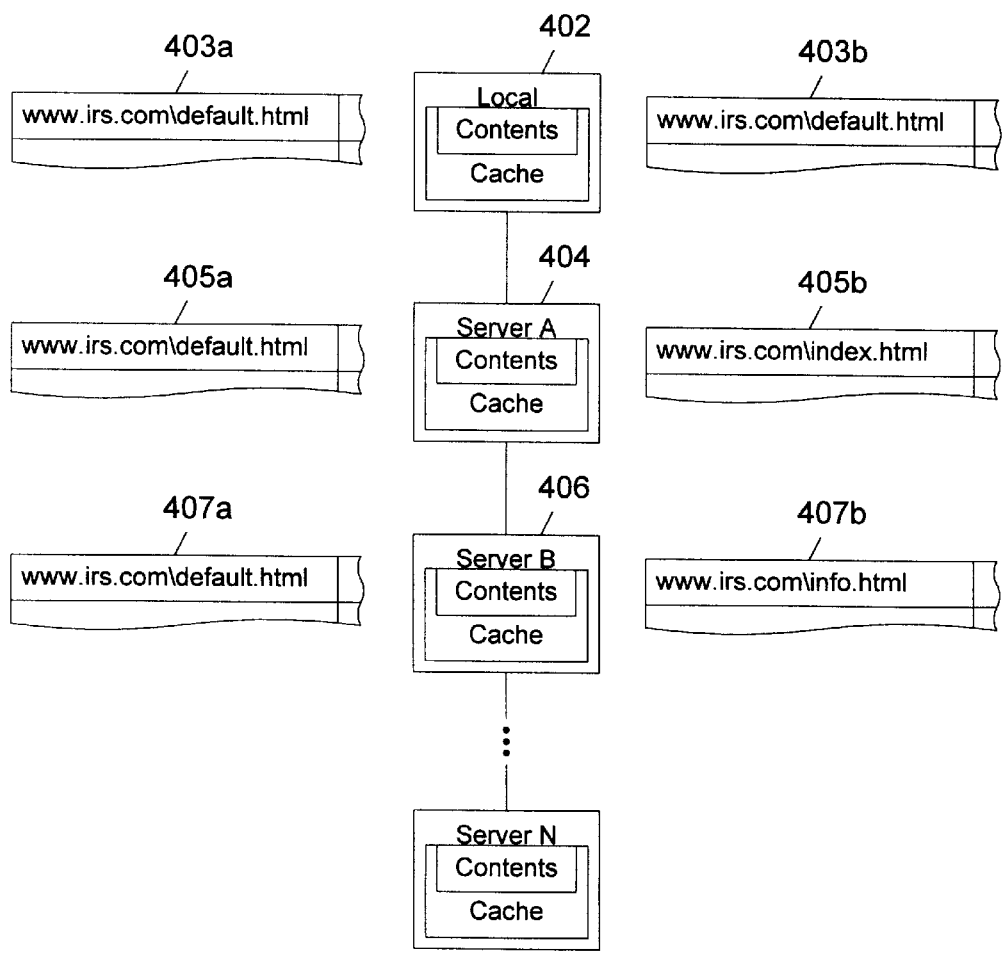
FIG. 3 depicts a data structure employed in remotely caching Web pages at a shared server in accordance with a preferred embodiment of the present invention.
FIG. 4 is a block diagram for an arrangement of multiple remote/local caches in accordance with a preferred embodiment of the present invention.

With reference now to FIG. 3, one possible example of a data structure employed in remotely caching Web pages at a shared server in accordance with a preferred embodiment of the present invention is depicted. It is common practice in virtually all data processing system architectures and operating systems that remote file input/output (I/O) subsystems provide access to remote files in a local/remote transparent manner, such that applications requiring access to remote files do not distinguish between remote and local files. Given this behavior, a client system running a browser application may configure the browser cache to reside on a remote file server.

One change required to permit sharing of a browser cache residing on a remote file server arises in the area of maintaining information on cache contents. While currently access to information regarding cache contents is limited to each client system/browser, information regarding the contents of a shared browser cache must be shared along with the actual Web pages stored within the cache. A data structure 300 such as that depicted in FIG. 3 may be maintained in the same remote file area as the shared cache, with each client system sharing the cache having access rights to the data structure. Alternatively, data structure 300 may be maintained within each client system including a browser caching at the shared cache, with a mechanism for updating data structure 300 when other client systems sharing the common cache add or update Web pages to the shared cache.

In the example depicted, data structure 300 includes identifiers 302 of the Web pages maintained in the shared cache, such as the URL of the Web page's Internet location, together with an associated indicator 304 of the last time the cache was updated. Indicator 304 supports the ability to "time-out" a cached page in the shared cache, requiring a client system seeking to access that page to load the page from the Internet source and update the cache.

Each entry in cache contents data structure 300 may also include an associated flag 306 for indicating "in progress" caching. If one client system is in the process of caching or updating a Web page in the shared cache, other client systems seeking to access the same page should wait for the caching or update to be completed instead of accessing the page at the Internet source. The "in progress" flag 306 would be set by any client system loading or reloading a Web page in the shared cache, and checked by any client system before accessing a cached page. Once caching or updating of the page is complete, in-progress flag 306 may be reset.

Cache contents data structure 300 may also include other entry components 308 utilized for other purposes, such as indicating an access privilege for cached pages. In addition, the present invention may be extended to include multiple remote and/or local caches, in either a hierarchical or complementary arrangement. Therefore, entry components 308 may also include an indication (such as a path and filename) of other caches containing the same page, so that a client system updating a page as a result of the page being "timed out" within the top-level shared cache may update all caches in a hierarchy containing that page.

Referring to FIG. 4, a block diagram for an arrangement of multiple remote/local caches in accordance with a preferred embodiment of the present invention is illustrated. The arrangement depicted includes a local cache 402 and two remote caches 404 and 406. There are a variety of reasons for employing multiple local and remote caches for a browser application. For example, a particular client system may have access to Web pages which are not generally accessible on the Internet. For security reasons, caching of such Web pages would preferably be maintained locally, rather than at a shared, remote cache. Moreover, the size of a shared cache may be so large as to preferably require distribution over multiple remote caches on different servers.

Support for multiple browser caches is required for an arrangement to include both local and remote caches as depicted in FIG. 4. Each cache 402, 404, and 406 within the arrangement may include a cache contents data structure as described above in connection with FIG. 3. The arrangement may be hierarchical, with the same page being cached in more than one local and/or shared remote cache. The cache contents data structure for each cache would thus reflect the same Web page as being contained within multiple caches, as depicted in data structure portions 403a, 405a, and 407a. Browsers seeking to access a Web page would first seek the page in a local cache before checking any of the remote caches. Under a hierarchical arrangement, a browser may check a local cache before checking a remote, shared cache and/or update a local cache from a remote, shared cache.

Alternatively, the arrangement may be complementary, with different pages being cached in different local or remote caches. The respective cache contents data structures for the different caches would thus reflect different pages being stored in different local and/or remote shared caches, as depicted by data structure portions 403b, 405b, and 407b. Browsers seeking to access a Web page would check the cache contents of each cache to ascertain the location of a cached page within the cache system accessible to the browser.

Figure 5A:
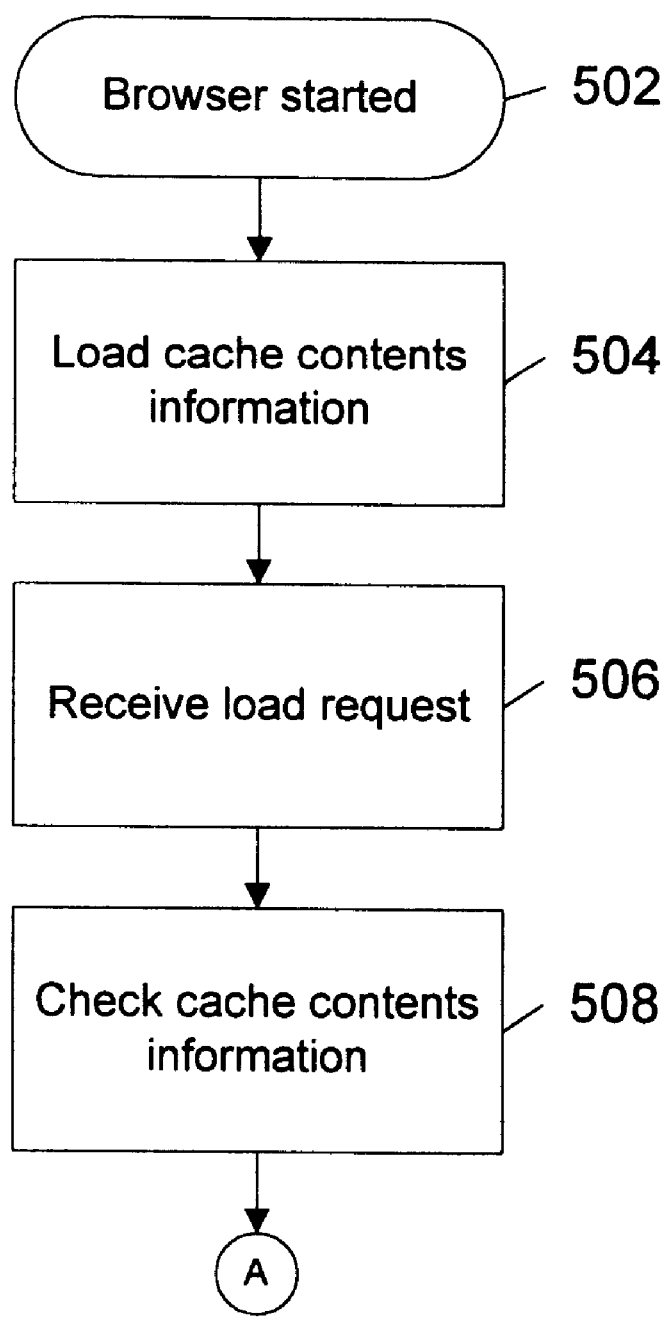
FIGS. 5A–5B depict a high level flowchart for a process of employing a remote, shared cache in accordance with a preferred embodiment of the present invention.
Figure 5B:
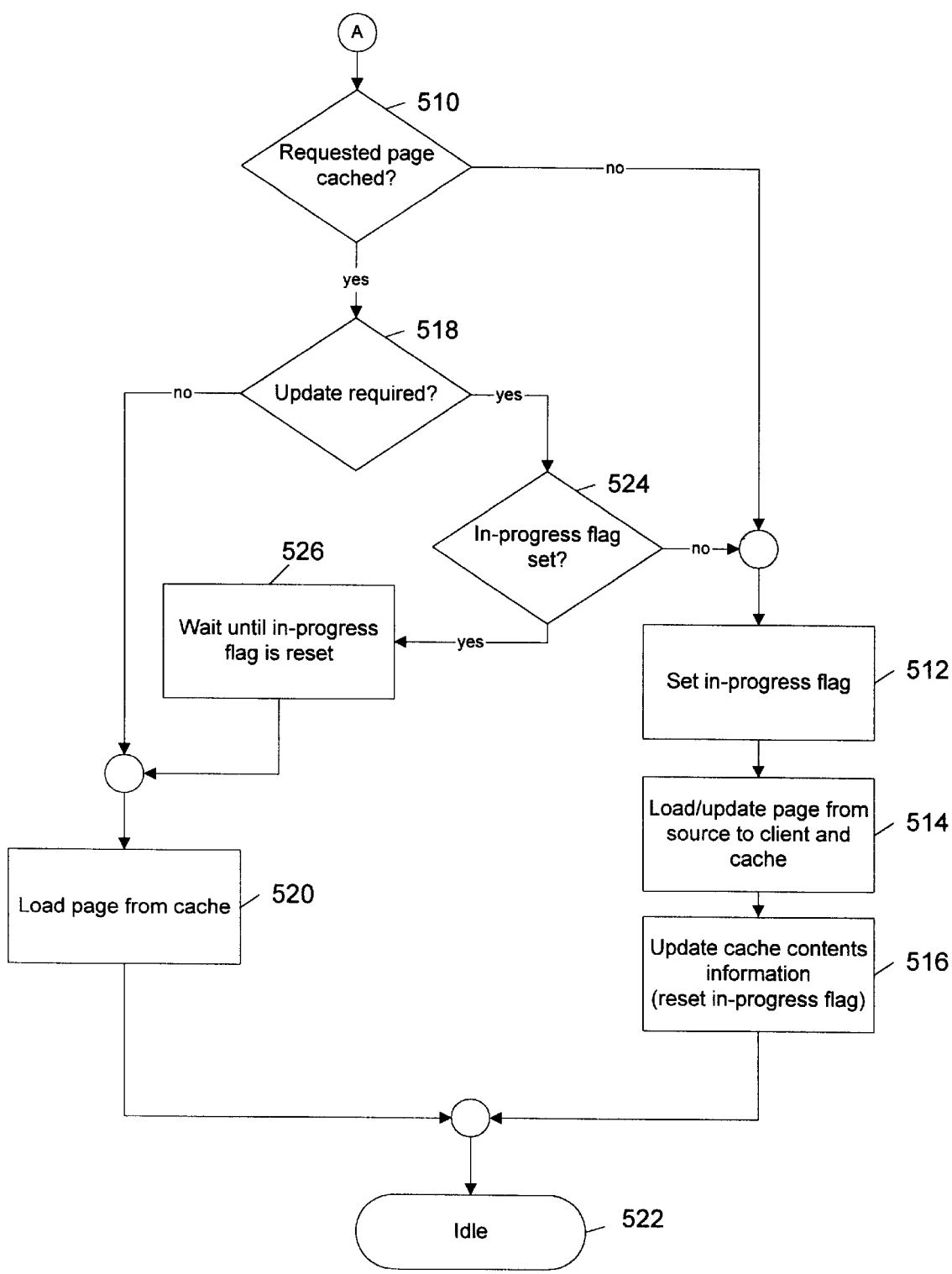

With reference now to FIGS. 5A–5B, a high level flowchart for a process of employing a remote, shared cache in accordance with a preferred embodiment of the present invention is depicted. The process begins at step 502, which depicts a browser application being started on a client system, such as user unit 102 depicted in FIG. 1, having access to a shared file area in a server, such as server 116 depicted in FIG. 1. The process then passes to step 504, which illustrates loading the cache contents information. In configurations employing multiple local/remote or multiple remote caches, the cache contents information for each cache is loaded.

The process next passes to step 506, which depicts a request being received to load a specific Web page, identified by the URL of the page's location on the Internet. The process passes next to step 508, which illustrates checking the cache contents information. Where a multiple cache configuration is supported, the cache contents information for each cache in the configuration is checked.

The process then passes to step 510, which depicts a determination of whether an acceptably recent copy of the requested page is cached in one or more caches accessible to the browser. If a sufficiently recent version of the requested page is not cached in a local or remote shared cache accessible to the browser, the process proceeds to step 512, which illustrates setting the in-progress flag associated with the requested page in the cache contents information for each cache which should contain the requested page. The process then passes to step 514, which depicts loading or updating the requested page from the Internet source, and caching the requested page. This step may include a lookup to a policy for caching at various local and/or remote shared caches.

In a multiple cache configuration, the page may be cached in a local cache or a remote shared cache, or both, depending on the management algorithm implemented in the browser. For example, pages loading under a limited access restriction may be cached only in the local cache, while other pages may be cached in both the local and remote shared caches and deleted from the local cache sooner than from the remote cache. The process then passes to step 516, which illustrates updating the cache contents information for each cache in which the requested page was stored or updated, including resetting the in-progress flag.

Referring again to step 510, if the requested page is cached in a cache accessible to the browser, the process proceeds to step 518, which depicts a determination of whether an update of the requested page in the cache is required. If the requested page has not "timed out" and does not require an update (i.e. is not "stale" or "invalid"), the process proceeds to step 520, which illustrates loading the requested page from the cache. It should be noted that a time-out policy is only one refresh mechanism which may be employed in connection with the present invention. An alternative is to have the server at the Web site from which the Web page was retrieved notify the caching server when the page is changed. The particular mechanism employed to flush stale or unusable data from caches may be determined by the cache management facilities for the browsers employed within the intranet.

For some applications, a user may wish to have caches pages updated more frequently than the default time-out employed for the shared remote cache. In fact, some time-critical applications (such as financial applications) may not wish to utilize cached Web pages at all since the data within the page is dynamic. From step 520, the process then passes to step 522, which depicts the process becoming idle until a load request for another page is received.

If an update of the requested page is required, the process proceeds to step 524, which illustrates a determination of whether the in-progress flag associated with the requested page in the cache contents information is set. If so, the process proceeds to step 526, which depicts the process waiting until the in-progress flag is reset. The process then passes to step 520, described above. If the in-progress flag is not set, however, the process proceeds to through steps 512–516, described above, to step 522.

The present invention allows browsers for user units connected to a remote, shared file server to leverage the ability to store cached Web pages in a common area on the file server. By caching Web pages in a common file area, the present invention allows all users of the shared cache to benefit from the first user's access or updating of a Web page. Additionally, the maximum size of the cache may be larger on a file server than on a local client system.

Because the cached Web pages are shared, redundant caching is reduced or eliminated since the same page need not be cached twice or more in separate caches, but need only be cached once in a single, shared cache. Additionally, a larger amount of distinctive information may be cached. Caching at a server thus scale the performance benefits obtained in the page browsing of other users. Browser applications must be configured to support remote caches shared among multiple browsers, as described above, scaling beyond caching at a proxy.

It is noteworthy that existing browsers cache, and that existing browsers could, without source-code level modification, cache at a file server. However, existing browsers are not capable of sharing caches, and thus separate sections of the file server would be employed for each browser cache. In the present invention, browsers for different client systems within an enterprise cache to the same section of a file server. Additionally, the cache management function employed in the present invention requires awareness of all caches. In the preferred embodiment, the cache management function runs on the proxy within an intranet. However, it is not necessary that the cache management function run on the proxy, but may instead be distributed to all browsers. Coordination of cache management activities by different browsers may be based on the "in progress" flag of the present invention, or similar flags.

Although the preferred embodiment employs a single cache in a shared file area of a commonly accessible server for the shared cache, the shared cache may alternatively be distributed among user units within the intranet. In such an embodiment, the cache portions in various user units should be accessible to other user units within the intranet (i.e. stored within a shared file area of the user units), and the shared cache contents information should contain pointers to the cache portion(s) containing cached pages.

The present invention may also be extended for implementation by an Internet service provider rather than merely within an Intranet for an enterprise. A trust protocol must be established between the subscribers and the service provider to assure validity of the Web pages cached within a subscriber's user unit. Additionally, availability of the cache maintained within a subscriber's user unit (i.e. whether the subscriber's user unit is connected) must be checked within implementations of the present invention for an Internet service provider.

It is noteworthy that the present invention is not limited to HTTP requests or Web pages, but may be applied to other protocols such as file transfer protocol (FTP) or gopher. These Internet facilities are less popular than the Web, but are available and may benefit from shared caching in a remote location as described above in connection with browsers and retrieval of Web pages. In fact, Web pages may invoke ftp and/or gopher utilities, as in the case of downloading software demos or graphics from the Internet, and thus the embodiments described above may benefit from extension to include support for these protocols.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of sharing a remote cache within an intranet, comprising:

caching pages requested to be cached by browsers for data processing systems within the intranet in a shared cache accessible by the data processing systems and maintained within a shared file area in the intranet;

determining whether a request from a requesting browser within a data processing system in the intranet seeks a page contained within the shared cache;

responsive to determining that the request seeks a page contained within the shared cache, determining whether an update is required for the page within the shared cache;

responsive to determining that an update is not required for the page within the shared cache, providing the page to the requesting browser from the shared cache;

responsive to determining that an update is required for the page within the shared cache, determining whether another data processing system within the intranet is currently retrieving an updated copy of the page;

responsive to determining that another data processing system within the intranet is currently retrieving an updated copy of the requested page, waiting until the other data processing system completes retrieval of the updated copy of the page and then providing the page to the requesting browser from the shared cache;

responsive to determining that no other data processing system within the intranet is currently retrieving an updated copy of the page, retrieving an updated copy of the page utilizing the data processing system and the requesting browser and caching the updated copy of the page within the shared cache.

2. The method of claim 1, further comprising:
configuring the browsers to cache at least some pages within the shared cache.

3. The method of claim 1, further comprising:
maintaining cache contents information for the shared cache in the shared file area, the cache contents information including, for each page within the shared cache, a flag indicating whether a data processing system within the intranet is currently retrieving an undated copy of the respective page.

4. The method of claim 3, wherein the step of determining whether a request seeks a page contained within the shared cache further comprises:
receiving a load request from the requesting browser for a page; and
checking said cache contents information to determine if the cache contains the requested page.

5. The method of claim 3, wherein the step of determining whether another data processing system within the intranet is currently retrieving an updated copy of the page further comprises:
checking a state of the flag within the cache contents information.

6. The method of claim 1, further comprising:
caching selected pages at a local cache within the data processing system in which the requesting browser executes; and
responsive to receiving the request from the requesting browser, checking the local cache for the page prior to checking the shared cache.

7. The method of claim 6, wherein the step of caching selected pages at a local cache further comprises:
caching pages at the local cache in a hierarchical relationship to pages cached in said shared cache.

8. The method of claim 6, wherein the step of caching selected pages at a local cache further comprises:
caching pages at the local cache in a complementary relationship to pages in the shared cache.

9. The method of claim 6, wherein the step of caching selected pages at a local cache further comprises:
caching pages of a greater aggregate size in the local cache than in the shared cache.

10. An intranet, comprising:
a plurality of user units each having a browser for Internet access;
a server connected to the plurality of user units and providing Internet access to the plurality of user units; and
a shared browser cache accessible to the plurality of user units,
wherein a user unit within the plurality of user units requesting a page
determines whether the page is contained within the shared browser cache and,
responsive to determining that the pare is contained within the share browser cache, determines whether an update is required for the page contained within the shared browser cache, and
responsive to determining that an update is not required for the page contained within the shared browser, retrieves the page from the shared browser cache, and
responsive to determining that an update is required for the page contained within the shared browser cache, determines whether another user unit is currently retrieving an updated copy of the page, and
responsive to determining that another user unit is currently retrieving an updated copy of the page, waits until the other user unit completes retrieval of the updated copy of the page and then retrieves the page from the shared browser cache, and
responsive to determining that no other user unit is currently retrieving an updated copy of the page, retrieves an updated copy of the page and cache the updated copy within the shared browser cache.

11. The intranet of claim 10, wherein the shared browser cache is maintained within the server.

12. The intranet of claim 10, wherein the shared browser cache is maintained within a second server connected to the plurality of user units.

13. The intranet of claim 10, wherein the server further comprises:
a firewall protecting the plurality of users units from external data processing systems connected to the intranet; and
a proxy providing Internet access to the plurality of user units.

14. The intranet of claim 10, further comprising:
a timeout mechanism flushing stale pages from the shared cache.

15. The intranet of claim 10, wherein a cache management facility for a browser running on a user unit within the plurality of user units flushes stale pages from the shared cache.

16. The intranet of claim 10, further comprising:
at least one user unit having a browser not caching pages in the shared cache.

17. The intranet of claim 10, further comprising:
at least one user unit having a browser caching pages in both a local cache and the shared cache, the browser checking the local cache before the shared cache.

18. The intranet of claim 10, further comprising:
at least one user unit having a browser caching pages in either a local cache or the shared cache, the browser checking the local cache before the shared cache.

19. The intranet of claim 10, wherein the shared cache is distributed among the plurality of user units.

20. An Internet server, comprising:
a data processing system;
connections to the data processing system for a plurality of user units, the data processing system capable of receiving requests for Internet pages and capable of accessing a shared cache,
wherein the data processing system provides cache contents information regarding the shared cache to each of the plurality of user units, the cache contents information including
(1) an identification of each page within the shared cache, and
(2) for each page within the shared cache,
 (a) a date on which the respective page was last undated, and
 (b) a flag indicating whether a user unit is currently updating the respective page, and
wherein the data Processing system sets the flag within the cache contents information for a page within the shared cache when retrieving an updated copy of the page for a user unit, and
wherein the data processing system, upon receiving a request for a page from a user unit, provides the requested page from the shared cache.

21. The Internet server of claim 20, wherein the shared cache is maintained on the server.

22. The Internet server of claim 20, wherein the shared cache is maintained on a second server accessible to the server, the server further comprising a connection to the second server.

23. An Internet client, comprising:

a data processing system capable of accessing a remote, shared cache;

a connection from the data processing system to a server providing Internet access to the data processing system; and a browser application executing in the data processing system, the browser application requesting pages from an Internet site and storing retrieved pages in the remote, shared cache, wherein the browser application, prior to retrieving an undated copy of a page within the remote, shared cache, determines from the server whether another data processing system is currently retrieving an updated copy of the page to the remote, shared cache, and responsive to determining that another data processing system is currently retrieving an updated copy of the page to the remote, shared cache, waits for the other data processing to complete retrieval of the updated copy of the page to the remote, shared cache and then retrieves the page from the remote, shared cache, and responsive to determining that no other data processing system is currently retrieving an updated copy of the page to the remote, shared cache, retrieves an updated copy of the page and caches the updated copy within the remote, shared cache.

24. The Internet client of claim 23, wherein the browser application is capable of accessing cache contents information stored in a remote, shared file area, the cache contents information including an identification of each page within the remote, shared cache and, for each page within the remote, shared cache, a flag indicating whether a data processing system utilizing the remote shared cache is currently retrieving an updated copy of the respective page.

25. The Internet client of claim 23, wherein the browser application updates the cache contents information upon storing a page in the remote, shared cache.

26. A computer program product in a computer usable medium, comprising:

instructions on the computer usable medium for retrieving a Web page in response to receiving a request;

instructions on the computer usable medium for caching the Web page in a shared cache remote from a data processing system originating the request;

instructions on the computer usable medium for determining, prior to retrieving an updated version of a page within the shared cache, whether another data processing system utilizing the shared cache is currently retrieving an updated version of the page; and instructions on the computer usable medium, responsive to determining that another data processing system utilizing the shared cache is currently retrieving an updated version of the page, for waiting until the other data processing system completes retrieval of the updated version of the page and then retrieving the page from the shared cache.

27. The computer program product of claim 26, further comprising:

instructions on the computer usable medium for updating cache contents information maintained in a shared file area upon caching the Web page in the shared cache.

28. The computer program product of claim 27, further comprising:

instructions on the computer usable medium for checking the cache contents information in response to receiving the request for a Web page.

29. A computer program product in a computer usable medium, comprising:

instructions on the computer usable medium for causing each retrieved page to be cached in a shared cache remote from a data processing system executing the instructions;

instructions on the computer usable medium for checking, prior to retrieving an updated version of a page within the shared cache, a flag associated with an identifier for the page within cache contents information for the shared cache, wherein the flag indicates whether another data processing system utilizing the shared cache is currently retrieving an undated version of the page;

instructions on the computer usable medium, responsive to the flag not being set, for retrieving an updated version of the page; and instructions on the computer usable medium, responsive to the flag being set for waiting until the flag is no longer set and then retrieving the page from the shared cache.

30. The computer program product of claim 29, further comprising:

instructions on the computer usable medium for causing cache contents information maintained in a shared file area to be updated when the page is retrieved.

* * * * *

UNITED STATES PATENT AND TRADEMARK OFFICE
CERTIFICATE OF CORRECTION

PATENT NO. : 6,192,398 B1
DATED : February 20, 2001
INVENTOR(S) : Hunt

It is certified that error appears in the above-identified patent and that said Letters Patent is hereby corrected as shown below:

<u>Column 9,</u>
Line 58, please delete "pare" and insert -- page --.

Signed and Sealed this

Fourth Day of December, 2001

Attest:

*Nicholas P. Godici*

NICHOLAS P. GODICI
*Attesting Officer*     *Acting Director of the United States Patent and Trademark Office*